Nov. 9, 1965   R. H. WENTORF   3,216,942
N-TYPE SEMICONDUCTING CUBIC BORON NITRIDE
Filed July 10, 1961
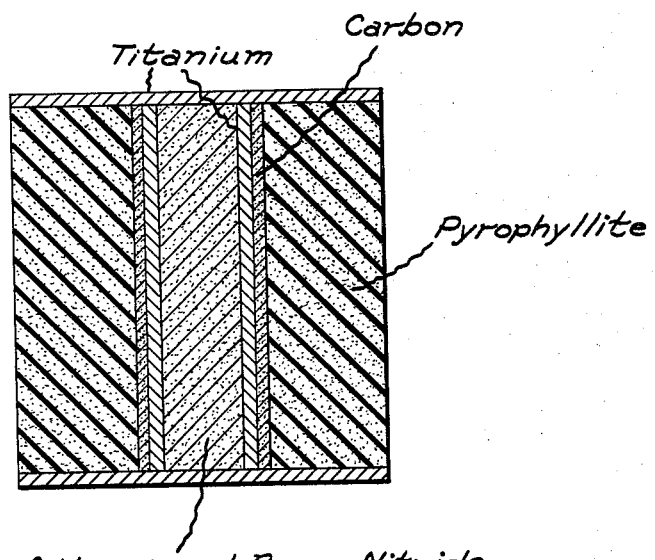
Inventor:
Robert H. Wentorf Jr.,
by James J. Lichiello
His Attorney.

3,216,942
N-TYPE SEMICONDUCTING CUBIC
BORON NITRIDE
Robert H. Wentorf, Jr., Schenectady, N.Y., assignor to General Electric Company, a corporation of New York
Filed July 10, 1961, Ser. No. 122,773
1 Claim. (Cl. 252—62.3)

This invention is concerned with electrically conducting cubic boron nitride and methods for making the same. More particularly, this invention relates to a cubic boron nitride of an electrically conducting nature, which can be prepared by heating at elevated temperatures and pressures hexagonal boron nitride or a source of hexagonal boron nitride in the presence of either sulfur or selenium, or both, employing the usual catalyst for conversion of the starting boron nitride to the cubic boron nitride state.

The term "electrically conductive cubic boron nitride" refers to a cubic boron nitride crystal capable of conducting electrical current by means of mobile electrons similar to the conduction of electric current through metals. The term is intended to exclude the conduction of electricity in a crystal by connected inclusions therein of foreign materials, such as metals, where conduction is through the inclusion only. "Semiconduction," however, is a term included with respect to the cubic boron nitride crystals of this invention.

In U.S. Patent 2,947,617 issued August 2, 1960, and assigned to the same assignee as the present invention, which by reference is incorporated herein, there is described and claimed an abrasive material comprising cubic boron nitride. This cubic boron nitride, which has an atomic configuration corresponding to the atomic configuration of zinc blend (ZnS), is prepared by converting the common form of boron nitride, for instance, hexagonal boron nitride, to the cubic form by means of heat and pressure in the presence of at least one catalyst selected from the class consisting of alkali metals, alkaline earth metals, tin, lead, antimony and nitrides of the foregoing metals, the pressures and temperatures being selected so as to be in the range in which the catalyst is operative to catalyze the conversion of ordinary boron nitride to cubic boron nitride. This cubic boron nitride is different from the usual hexagonal boron nitride (which is a relatively soft powdery material and therefore useless for abrasive purposes) by having a cubic crystalline configuration analogous to the configuration of zinc blend and having a unit cell edge length of approximately 3.615 angstroms. This cubic boron nitride has a hardness substantially equal to the hardness of diamond and is thermally stable at a temperature even as high as around 2000° C.

In general, the reaction, whereby the usual boron nitride is converted to the cubic boron nitride, is carried out in the cubic boron nitride stable region at a pressure of at least about 1200° C. and preferably between 1200° C. to 2200° C. at a pressure above about 42,000 atmospheres, for instance, about 45,000 to 110,000 atmospheres or more. A more preferred narrow range of reaction conditions is within a temperature range of from about 1500 to 2100° C. at a pressure of about 50,000 atmospheres to 100,000 atmospheres. More particular directions for carrying out the conversion of the usual boron nitride to the cubic boron nitride form (such as catalyst, nitride source, catalyst source, apparatus, etc.) are found in the aforementioned patent.

In the preparation of cubic boron nitride from the usual boron nitride, the cubic boron nitride is substantially non-conducting electrically, i.e., it has a specific resistance or resistivity greater than $10^{12}$ ohm-centimeters. It has been discovered that by incorporating a small amount of an additive selected from the class consisting of selenium and sulfur (hereinafter referred to as "additive") with the usual boron nitride and a catalyst, for conversion of the latter to the cubic boron nitride form, electrically conducting cubic boron nitride is obtained with a conductivity which varies to a degree with the catalyst used and with the concentration of the additive employed.

Generally, from about 0.001 to as high as 10 percent, by weight, or more of the additive may be utilized, such as a minor weight amount, based on the weight of the starting boron nitride, i.e., the hexagonal boron nitride. Instead of employing selenium or sulfur as the additive for obtaining conducting cubic boron nitride, compounds of selenium or sulfur also may be utilized, which under the conditions of the reaction at the elevated temperatures and pressures, are converted to elemental selenium or sulfur. In any event, it is to be understood that whether the process includes the additives initially, or a compound of the additive decomposable to the elemental state, it is the additive which is causing the electrical conductivity in the cubic boron nitride. For brevity, the term "selenium" or "sulfur" is intended to include in the specification and claims, not only selenium and sulfur, but also compounds of selenium and sulfur decomposable to the elemental state. By varying the weight of the additive, cubic boron nitride crystals are obtained having specific electrical resistances within the range of from $1 \times 10^4$ to $6 \times 10^5$ ohm-centimeters as contrasted to the usual $10^{10}$ to $10^{12}$ ohm-centimeters or higher specific resistance for unmodified cubic boron nitride.

When making semiconducting cubic boron nitride, in addition to the use of the additives which is selected from a class consisting of selenium and sulfur, the remainder of the ingredients will comprise those designed to give the usual cubic boron nitride as described in my aforementioned Patent 2,947,617. It is believed that the ultimate reactants involved in the preparation of the cubic boron nitride, other than the above-described additives, are hexagonal boron nitride and the catalyst nitride. Thus, any combination of starting ingredients which will provide both hexagonal boron nitride and a catalyst nitride can be employed in the practice of the present invention. One method of providing this ultimate reactant mixture is to start with a reaction mixture of elemental boron and a catalyst nitride. Thus, by this procedure when the reactants are brought to reaction pressure and temperature, an equilibrium is established between the reactants so that part of the nitrogen associated with the catalyst becomes associated with the boron so that the reaction mixture at equilibrium contains both the catalyst nitride and boron nitride.

Thus, it is evident that the starting reaction mixture, in addition to the above-described additives, must contain a source of boron, a source of nitrogen, and a source of catalyst metal. The source of the boron can be elemental boron, hexagonal boron nitride, or a material such as one of the boron hydrides which will decompose to elemental boron under the conditions of the reaction. The source of nitrogen can be either hexagonal boron nitride or a nitrogen-containing compound which will provide a source of nitrogen under reaction conditions. The catalyst metal may be employed as the elemental metal or a catalyst compound which will decompose to the catalyst metal or to the catalyst metal nitride under reaction conditions. Illustrative of a catalyst metal compound is in the reaction of calcium cyanamid with boron to produce cubic boron nitride. It is believed that this reaction involves the preliminary decomposition of the calcium cyanamid to produce calcium nitride and boron nitride which together react to form cubic boron nitride.

It should be understood that process of the present invention is not limited to the catalytic conversion of hexagonal boron nitride to cubic boron nitride involving only one catalyst material. Thus mixtures of two or more of the catalyst materials can be employed, as can alloys of the metals recited above, such as alloys of more than one catalyst metal and alloys of a catalyst metal and a non-catalyst metal.

In making cubic boron nitride having electrically conducting properties, there is provided homogenous mixture of the source of boron, e.g., hexagonal boron nitride, the specific catalyst employed, and the additive, all preferably in the finely divided state, and thereafter the mixture is subjected to elevated temperatures and pressures to obtain the electrically conducting cubic boron nitride. Alternatively, cubic boron nitride may be mixed with the additive and catalyst, and at elevated temperatures and pressures at which the cubic boron nitride is formed, the latter is reconstituted to form cubic boron nitride having the desired electrical conductivity. An apparatus suitable for carrying out the high temperature, high pressure reaction required to form electrically conducting cubic boron nitride is described and illustrated in U.S. Patent 2,941,248, Hall, issued June 21, 1960 and assigned to the same assignee as the present invention. As pointed out in U.S. Patent 2,947,617, the catalyst used in making electrically conducting cubic boron nitride may be employed in the form of coarse or fine powders, or as a tube within which the hexagonal boron nitride and the additive are introduced, the tube itself acting as a catalyst for the conversion of the hexagonal boron nitride to the cubic boron nitride. Titanium, tantalum or carbon tubes may also be used to contain the ingredients.

Certain advantages are to be derived in using certain types of assemblies for effecting conversion of the hexagonal boron nitride (or other source of the non-cubic form of boron nitride) to the cubic boron nitride state. In particular, a mixture of hexagonal boron intride, additive, and catalyst for conversion of boron nitride to the cubic form is advantageously introduced into a titanium or tantalum tube, preferably a titanium tube because of the economic consideration involved, prior to placing the mixture of ingredients in the press apparatus more particularly described in the above Hall patent and in my aforesaid Patent 2,947,617. Under the conditions of the reaction, the titanium or tantalum is converted to the nitride or boride forms, for instance, titanium nitride and/or titanium boride (as well as the tantalum nitride and/or tantalum boride) which take on a refractory state and preventing leakage of the contents from the tube. In the absence of such an assembly, whereby the reaction ingredients are merely placed in a tube comprising the compressible gasket material, for instance, a tube of pyrophyllite, there are losses encountered resulting in reduced yields of the conducting cubic boron nitride due to leakage. When employing a titanium tube, it is also desirable that the titanium tube be encased in an electrically conducting yet protective casing, for instance, a tube of carbon, to prevent undue oxidation, i.e., deterioration, of the titanium tube which would obviously defeat the purpose in using the titanium tube or vessel.

The amount of catalyst may vary widely. Preferably, from about 0.1 to 1 part of catalyst per part of the hexagonal boron nitride is used, although it is obvious that larger or smaller amounts of the catlayst per part of boron nitride may be employed without departing from the scope of the invention. The larger amounts of catalyst will reduce the amount of cubic boron nitride formed, and ordinarily this excessive amount of catalyst is not essential. Generally, it is only necessary to place the mixture of the additive, catalyst, and hexagonal boron nitride in a press apparatus in a suitable reaction vessel such as a tantalum or graphite tube or even a tube made from the catalyst metal (in which case no additional catalyst is needed) and subject the assembly to a pressure within the range described above for about 5 to 30 minutes to form the electrically conducting cubic boron nitride.

In order that those skilled in the art may better understand how the present invention may be practiced, the following examples are given by way of illustration and not by way of limitation. All parts are by weight.

The pressure conditions were determined in the manner described in my aforesaid U.S. Patent 2,947,617 using as standards the electrical resistance transition pressures of 60,000 atmospheres for the barium transition [formerly believed by P. W. Bridgman as shown in "Proceedings of the American Academy of Arts and Sciences," 81, p. 165–251 (1952) to occur at 77,400 atmospheres] and 24,800 atmospheres for the bismuth I to II transition.

In these examples, the high pressure, high temperature apparatus used was that described in the aforesaid Hall patent. In general, the manner of carrying out the high pressure and high temperature reactions was as follows. A charge of 1.7 parts hexagonal boron nitride, 0.425 part $Li_3N$ catalyst, and sulfur in the amount specified in Table I below, all in the finely divided state, was placed in a titanium tube open at both ends and whose dimensions were 0.93 inch long and having an outside diameter of 0.375 inch and an inside diameter of 0.357 inch. The titanium tube was encased by a close fitting, spectroscopic (high purity) carbon tube 0.93 inch long and having an outside diameter of 0.44 inch and this assembly in turn was placed in another snugly fitting tube comprising the compressible ceramic, specifically pyrophyllite, described in my aforementioned patent, also 0.93 inch long and having an outside diameter of 0.75 inch.

End caps or disc closures of titanium metal (about 0.02 inch thick) were placed at each end of the titanium tube so that the end caps covered the end surfaces of the titanium tube, the carbon tube, and the pyrophyllite tube, as is more particularly described in the attached drawing in which the single cross-sectional figure shows the relationship of the three nesting tubes. After carrying out the high temperature, high pressure reaction, under the conditions recited in the following Example 1, the cubic boron nitride was separated by dissolving the matrix in which cubic boron nitride was formed, in hydrochloric acid or aqua regia. This resulted in most cases in a mixture of cubic boron nitride with some unreacted hexagonal boron nitride. The cubic boron nitride was separated from the hexagonal material by hand, or by using a filtration technique in which the mixture was added to bromoform in which the hexagonal boron nitride would float and in which the cubic boron nitride sinks. In all examples, resistance heating was employed to bring the reactants to the desired temperature. The formation of cubic boron nitride was established by X-ray crystallography, refractive index, density, chemical analysis, and hardness tests. The conductivity (or specific resistance) was established by the probe technique which is a well known means for determining conductivity. The semiconducting properties were established by thermoelectric power measurements.

EXAMPLE 1

Lithium nitride, hexagonal boron nitride, and sulfur were mixed together employing the proportions of lithium nitride and hexagonal boron nitride recited above. The amount of sulfur added in each instance is described in the following table. The mixture of ingredients was then placed, in each instance, in the concentric cylinders described above, the end caps of titanium placed across each end of the assembly as shown in the accompanying drawing, and the total assembly pressed for varying lengths of time at slightly varying temperatures and at pressures of about 45,000–60,000 atmospheres. Thereafter, the cubic boron nitride formed was isolated, and identified by its crystalline cubic habit, refractive index, and hardness as being cubic boron nitride, and conformed in every respect to the crystal structure of the cubic boron nitride recited in my aforesaid patent. The crystals were blocky in shape and between 0.1 and 0.3 mm. in their longest dimensioin. However, in contrast to the usual cubic boron nitride of low electrical conductivity, the cubic boron nitride prepared as a result of carrying out the process in the present example was quite electrically conducting and had a specific resistance within the range of $2\times10^3$ to $3\times10^6$ ohm-centimeters. The following Table I shows the amount of sulfur used in each charge, the temperature, the time for which pressures and temperatures were applied, and the resistivity in ohm-centimeters of the conducting products obtained.

Table I

| Sample No. | Sulfur (grams) | T., °C., Max. | Pressure, Thousands of Atm. | Time (Min.) | Specific Resistance, ohm-cm.[1] |
| --- | --- | --- | --- | --- | --- |
| A | 0.1 | 2,100 | 77 | 30 | $5\times10^3$ to $10^5$. |
| B | 0.2 | 2,050 | 77 | 20 | $4\times10^5$ to $3\times10^6$. |
| C | 0.05 | 2,050 | 77 | 30 | $2\times10^3$ to $10^5$. |
| D | 0.025 | 2,150 | 77 | 27 | $7\times10^3$ to $5\times10^5$. |

[1] The crystals had a maximum size of aromd 300μ.

As a result of thermoelectric power measurements, all of the above-described conducting cubic boron nitride crystals were found to exhibit n-type semiconducting properties when measured, for example, in the manner described in "Introduction to Semiconductors" by W. Crawford Dunlap, published by John Wiley & Sons, Inc., New York, N.Y. (1957).

It is also possible by means of this invention to prepare semiconducting cubic boron nitride having at least one p-n junction. Thus, one can heat at elevated temperatures and pressures conductive to forming cubic boron nitride, a mixture of ingredients which in the reaction vessel is in contact with a p-type semiconducting cubic boron nitride (prepared in accordance with my above-mentioned application Serial No. 2,978). The mixture of ingredients comprises those recited previously designed to give the n-type semiconducting cubic boron nitride such as, for instance, hexagonal boron nitride, lithium nitride and either or both selenium and sulfur as the additives. Examples 2 and 3 below illustrate the preparation of a cubic boron nitride, having a p-n junction in its structure.

EXAMPLE 2

In this example, p-type semiconducting cubic boron nitride crystals were prepared by heating a mixture on a weight basis of one part beryllium, 40 parts lithium nitride, and 150 parts hexagonal boron nitride, all in powder form, in the reaction vessel described previously for a period of about 15 minutes at about 58,000 atmospheres and at a temperature of about 2000° C. At the end of this time the cubic boron nitride thus formed was isolated in the usual manner and was found to have a specific resistance within the range of $1\times10^6$ to $5\times10^6$ ohm-centimeters. This conducting boron nitride exhibited p-type semiconducting properties. The preparation of semiconducting crystals of cubic boron nitride employing beryllium as the additive is more specifically described in my co-pending application Serial No. 2,978, filed January 18, 1960, now Patent No. 3,078,232, and assigned to the same assignee as the present invention.

EXAMPLE 3

In this example, cubic boron nitride crystals of the p-type prepared in accordance with Example 2 were mixed with 1.7 grams hexagonal boron nitride, 0.425 gram lithium nitride, 0.05 gram sulfur. The mixture of the above ingredients and the p-type semiconducting cubic boron nitride crystals was then heated at a pressure of about 54,000 amtospheres at a temperature of about 2000° C. for 30 minutes. At the end of this time, upon testing the formed crystals, it was found that they possessed rectifying properties of being able to pass current in both directions. In one instance, one of the newly formed crystals could pass current twice as easily in one direction as in the other with a 6 volt input at room temperature of about 23° C. The electrical resistance of these rectifying cubic boron nitride crystals, which contained a p-n junction, was in the range of $2\times10^5$ to $2\times10^7$ ohm. The crystals were about 0.3–0.5 mm. in size.

EXAMPLE 4

Employing the same reaction vessel and press equipment described previously for Examples 1 to 3, a charge of two parts hexagonal boron nitride, by weight, 0.5 part lithium nitride and 0.1 part selenium, all in the finely divided state, was heated at a temperature of about 2000° C. at a pressure of about 59,000 atmospheres for about 10 to 12 minutes. The resulting cubic boron nitride crystals were separated as was done in the previous examples, and thereafter tested and found to be n-type semiconductors by the usual thermoelectric power tests. These crystals, which varied from 0.1 to 0.3 mm. in average diameter, had resistivities within the range of from about $9\times10^3$ to $2\times10^5$ ohm-centimeters when measured at room temperature.

It will, of course, be understood by those skilled in the art that in addition to using the lithium nitride catalyst shown above, other catalysts, e.g., tin and magnesium nitride, may be employed, many examples of which have been recited above, without departing from the scope of the invention. The conditions may be varied as well as the concentration of the sulfur and selenium, and of the catalyst materials, without affecting the scope of the invention herein defined and claimed.

In the foregoing examples, all materials utilized were known materials with known impurity content. This applies not only to the hexagonal boron nitride and particular catalyst employed, but also to the reaction vessel materials, and in effect to all materials which would ordinarily be involved. Thus, for example, cubic boron nitride crystals are grown or have been grown under a given set condition with given materials and the cubic boron nitride crystals recovered were not electrically conductive. These results are known for literally hundreds of operations. Accordingly, a repeat operation utilizing only the addition of, for example, high purity, selenium or sulfur results in electrically conductive cubic boron nitride crystals. While high purity sulfur and selenium may contain very small amounts of impurities, many of these impurities are present in only minute trace amounts and not all are present in sulfur and selenium prepared by different processes. In any event, many of these impuritise are present in cubic boron nitride crystals which are not electrically conductive. Furthermore, some of these impurities are present in surrounding and contiguous objects in a high pressure high temperature reaction, and the cubic boron nitride crystals obtained are not electrically conductive. In addition, cubic boron nitride crystals have been grown by direct addition of these impurities with no electrically conducting cubic boron nitride crystal resulting. The evident conclusion is that in view of these results taken in connection with the electrically conductive crystals, that the additive is the activator material.

In addition, the cubic boron nitride crystals of each example were carefully screened for those of good clarity and form with no apparent impurities, and no impurities indicating extensive inclusion between crystal faces. Thereafter, these cubic boron nitride crystals were treated by hot acid treatment to dissolve any surface impurities and to leach out any inclusions having a surface contact. By this means, electrical surface contact, for example, between probes is substantially eliminated.

Electrically conducting cubic boron nitride herein prepared has many uses. Primarily because of the fact that it has an n-type conductivity, the electrically conducting cubic boron nitride crystals are useful as semiconductors and semiconducting devices such as transistors, rectifiers, thermometers, etc. Additionally, the conducting cubic boron nitride can also be used as electroluminescent bodies for light sources or as high energy particle counters. The fact that the cubic boron nitride is electrically active recommends its use as a high temperature catalyst for oxidation or recombination reactions.

A still further use for these electrically conducting cubic boron nitride compositions is in connection with computer memory systems. Thus a "memory" phenomenon was observed when two cubic boron nitride crystals, one of the n-type and another of the p-type, were connected in series and small currents were passed through the crystals. It was found that the initial current in one direction depended upon the direction of the previous current through crystal. Thus, it was found that if in the first passage of the current through the crystal pair was in one direction, then when the applied e.m.f. was reversed, so that the current flowed in an opposite direction, the initial value of current in the second direction was about twice as large as the steady state value of current reached shortly thereafter. On the other hand, if the second passage of current was in the first direction, then the second and subsequent passages of current in this direction would be as expected for an ohmic circuit, i.e., current proportional to impressed voltage at all times. Computing machines could take advantage of such a property, particularly because of the advantages inherent in the small size of the semiconducting crystals and because of the small currents and voltages required to produce the memory effect.

While electrical conductivity measurements have been clearly described with respect to silver probes and given conditions, it is understood that various other probe materials such as gold, copper, iron, etc., may also be employed. It is evident that variations in conductivity may be predicated on the particular probe material and for apparatus. It is sufficient to say that the cubic form of boron nitride is produced which has an electrical conductivity substantially exceeding prior cubic boron nitride crystals grown without additives, and which is semiconducting.

What I claim as new and desire to secure by Letters Patent of the United States is:

N-type semiconducting cubic boron nitride consisting essentially of atoms of boron and nitrogen in an arrangement corresponding to the atomic configuration of zincblende having incorporated therein foreign atoms from the class consisting of selenium and sulfur in a quantity ranging from a small amount to about 10 weight percent based on the weight of the cubic boron nitride, said small amount being effective to reduce the specific resistivity of the cubic boron nitride to a value of less than about $10^{10}$ ohm-centimeters.

References Cited by the Examiner

UNITED STATES PATENTS

| | | | |
|---|---|---|---|
| 2,743,201 | 4/56 | Johnson et al. | 148—1.5 |
| 2,798,989 | 7/57 | Welker | 148—1.5 |
| 2,947,617 | 8/60 | Wentorf | 51—307 |
| 2,979,428 | 4/61 | Jenny et al. | 148—1.5 |
| 3,078,232 | 2/63 | Wentorf | 252—62.3 |

OTHER REFERENCES

Bassani and Celli: Bulletin American Physical Society, Ser. II, vol. 5, page 407 (A), Nov. 25, 1960.

Kleinman and Phillips: Physical Review, vol. 117, pp. 460–464, Jan. 15, 1960.

Taylor and Coulson: Procedures of Physical Society (London) A65,834, 1952.

DAVID L. RECK, *Primary Examiner.*

RAY K. WINDHAM, *Examiner.*